(12) United States Patent
Abels

(10) Patent No.: US 6,857,811 B2
(45) Date of Patent: Feb. 22, 2005

(54) BALL AND SOCKET JOINT FOR MOTOR VEHICLES

(75) Inventor: Olaf Abels, Belm (DE)

(73) Assignee: ZF Lemförder Metallwaren AG, Stemwede-Dielingen (DE)

( * ) Notice: Subject to any disclaimer, the term of this patent is extended or adjusted under 35 U.S.C. 154(b) by 64 days.

(21) Appl. No.: 10/333,237
(22) PCT Filed: May 17, 2002
(86) PCT No.: PCT/DE02/01832
§ 371 (c)(1), (2), (4) Date: Jan. 15, 2003
(87) PCT Pub. No.: WO02/095246
PCT Pub. Date: Nov. 28, 2002

(65) Prior Publication Data
US 2004/0101353 A1 May 27, 2004

(30) Foreign Application Priority Data
May 22, 2001 (DE) .......................... 101 25 232

(51) Int. Cl.⁷ .............................................. F16C 11/00
(52) U.S. Cl. .......................... 403/134; 403/50; 403/122; 403/132; 403/133; 403/135
(58) Field of Search .......................... 280/93.51, 93.511; 403/50, 51, 76, 122, 127, 140, 132–135

(56) References Cited

U.S. PATENT DOCUMENTS

| | | | |
|---|---|---|---|
| 3,208,779 A | | 9/1965 | Sullivan |
| 3,343,855 A | | 9/1967 | Husen |
| 3,343,857 A | * | 9/1967 | Cislo .......................... 403/132 |
| 3,357,728 A | | 12/1967 | Melton et al. |
| 3,472,540 A | | 10/1969 | Gottschald |
| 5,100,254 A | | 3/1992 | Wasada |
| 5,601,378 A | * | 2/1997 | Fukukawa et al. .......... 403/140 |
| 6,357,956 B1 | | 3/2002 | Zebolsky et al. |

FOREIGN PATENT DOCUMENTS

| | | |
|---|---|---|
| CH | 465 971 | 1/1969 |
| DE | 66 01 766 | 8/1967 |
| DE | 41 13 569 | 10/1991 |
| GB | 892025 | 3/1962 |

* cited by examiner

Primary Examiner—Daniel P. Stodola
Assistant Examiner—Michael P. Ferguson
(74) Attorney, Agent, or Firm—McGlew and Tuttle, P.C.

(57) ABSTRACT

A ball-and-socket joint for motor vehicles is presented, which has a ball pivot (1), which comprises at least one joint ball (4) accommodated rotatably and/or pivotably in a bearing shell (2) of a housing (3), and a pivot section (5). A sealing bellows (6), whose first edge area (7) is fastened to the housing (3) and whose second edge area (8) has a sliding connection with a thrust ring (9) fixed on the pivot section (5), is used to seal the joint components. A protective cover (11), which is used to seal the thrust ring area as well as for shielding against damaging heat radiation and against the effects of splash water or corrosive media, is inserted between a surface of the thrust ring (9) and the surface of a motor vehicle component (10), which said surface faces the said surface of the thrust ring.

25 Claims, 1 Drawing Sheet

BALL AND SOCKET JOINT FOR MOTOR VEHICLES

FIELD OF THE INVENTION

The present invention pertains to a ball-and-socket joint for motor vehicles, which has a ball pivot that comprises at least a joint ball accommodated rotatably and/or tiltably in a bearing shell and a pivot section. In addition, the inner components of the ball-and-socket joint are protected by a sealing bellows from the penetration of contaminants and moisture.

BACKGROUND OF THE INVENTION

The sealing bellows of ball-and-socket joints of this type has a first edge area, which is fastened to the housing. A second edge area of the sealing bellows is connected to a thrust ring fixed on the pivot section of the ball pivot via a sliding connection. Such a ball-and-socket joint for motor vehicles is shown, e.g., in CH 465 971. While the first edge area of the sealing bellows is fastened to the housing of the ball-and-socket joint by at least one tensioning ring, the second edge area has a sliding connection. This sliding connection is necessary in the prior-art design especially to make possible a relative movement between the sealing bellows and the ball pivot during rotary movements of the ball pivot around its longitudinal axis. Without such a mobility, the sealing bellows, which usually consists of rubber, would be unacceptably stressed and wear prematurely, because tensile loads may have a damaging effect on rubber. The service life of such a ball-and-socket joint would be consequently reduced.

Since ball-and-socket joints for wheel suspensions in motor vehicles are frequently arranged in the area near the wheel, as is the case in support joints or sliding joints, they are extremely stressed by, e.g., oils, greases, dirt, splash water and corrosive media, such as salt solutions.

Moreover, high thermal load is to be taken into account in case of arrangement in the vicinity of the brake disk. The brake disk is intensely heated during travel and it thus radiates heat, which represents an extreme stress for the components of the joint. It is therefore generally known that protective covers are provided as heat protection shields, which protect the sensitive components of the ball-and-socket joint from the heat radiation of motor vehicle components located in their vicinity. At the same time, these protective covers can also keep splash water away from the ball-and-socket joints at least to a limited extent. As was already mentioned in the introduction, it is necessary to provide thrust rings for one of the edges of the sealing bellows to compensate the rotary movements of the ball pivot. However, there is an additional risk potential for the components of the joint in case of the use of thrust rings, because the penetration of moisture or corrosive media under these thrust rings, e.g., by creeping, could lead to the appearance of corrosion phenomena, especially in the area of the thrust rings of such ball-and-socket joints, which would ultimately lead to a shorter service life of the ball-and-socket joint, because the joint components are worn off more rapidly than desired in the contact area due to the resulting corrosion, and it would no longer be possible to prevent moisture and contaminants from penetrating into the sensitive components of the joint inside the ball-and-socket joint. Additional sealing measures in the contact area between the thrust ring and the ball pivot also fail to rule out this risk altogether. Cleaning with high-pressure washers, in particular, imposes increased requirements on the sealing of affected assembly units.

SUMMARY OF THE INVENTION

The basic technical object of the present invention is to develop a ball-and-socket joint that offers improved protection for the sensitive components of the joint against both heat radiation and splash water and corrosive effects.

According to the invention, a ball-and-socket joint is provided for motor vehicles, with a said ball pivot which comprises at least a joint ball accommodated rotatably and/or pivotably in a bearing shell of a housing and a pivot section. A sealing bellows has a first edge area fastened to the housing and has a second edge area with a sliding connection with a thrust ring fixed on the pivot section. A protective cover is inserted between a surface of the thrust ring and a surface of a motor vehicle component against which the thrust ring is supported, which said surface faces the said surface of the thrust ring.

The protective cover is used in the known manner to shield the sensitive components of the ball-and-socket joint against heat radiation and the effect of splash water. By inserting the protective cover between the thrust ring and the motor vehicle component, sealing of the area of the thrust ring is, moreover, achieved, so that no moisture or no contaminants can penetrate in this section any longer. The motor vehicle component, which is used, among other things, as a contact surface for the thrust ring or to hold the protective cover, may be, e.g., a holder for a lever of a wheel suspension.

An embodiment of a ball-and-socket joint according to the present invention led to a very simple and therefore inexpensive variant, which effectively protects the ball-and-socket joint and thus prolongs its service life as a whole. Additional complicated sealing measures for the critical thrust ring sections can be avoided, so that, e.g., a separate coating of the thrust ring may be eliminated. A ball-and-socket joint according to the present invention is characterized by excellent heat, splash water and corrosion resistance.

According to one embodiment of the present invention, it is proposed that at least one section of the protective cover be made by a clamping connection between the surface of the motor vehicle component and the associated surface of the thrust ring.

However, a positive-locking or non-positive connection may also be provided between the thrust ring and the protective cover according to other embodiments of the present invention. For example, bonded connections or a vulcanization method may be considered.

To make possible the best possible sealing of the movable components of the ball-and-socket joint, it is, moreover, proposed that the pot-shaped protective cover surround at least part of the ball-and-socket joint in the circumferential direction of the ball-and-socket joint and that it extensively cover the sealing bellows in the longitudinal direction of the ball-and-socket joint. The direct contact area between the protective cover and the motor vehicle component is of decisive significance here for the sealing action of the overall system. The protective cover may, of course, surround the entire ball-and-socket joint in the circumferential direction.

To improve the possibilities of connection between the thrust ring and the protective cover or the sealing contact of the protective cover between the components associated with one another, the protective cover should be preferably manufactured from a high temperature-resistant plastic, rubber or unvulcanized rubber. Materials such as EPDM rubber or silicone rubber could be suitable. By using rather softer or more elastic materials, it is possible to establish a very tight connection, because the at least partial impression of the thrust ring in the edge area of the protective cover is thus achieved and the protective cover will come at the same time into contact with the surface of the associated motor vehicle component in an optimized manner. The thrust ring may be manufactured preferably from stainless or surface-protected metal or from plastic or a composite of metal and plastic. Depending on the material selected for the thrust ring and the protective cover, it is consequently also possible to embody these components in one piece. The fact that a reduced assembly effort is needed to manufacture the ball-and-socket joint and to insert same into the motor vehicle component could be considered to be a decisive advantage in case of the one-part design.

To guarantee a firm seating of the thrust ring on the ball pivot, on the one hand, and the meaningful support of the thrust ring on the associated motor vehicle component, on the other hand, it is proposed according to a variant of the present invention that the thrust ring be provided at least with two collars which form an angle with one another when viewed in the cross section. These collars preferably extend approximately at right angles to one another. The first collar is arranged firmly seated on the pivot section and the second collar is supported elastically with its surface facing the motor vehicle component on the associated surface of the motor vehicle component.

As was stated above, it is possible to make the thrust ring and the protective cover in one piece or as multiple pieces. If two separate parts are used for the combination of these components, it is advantageous according to another suggestion according to the present invention for the second collar of the thrust ring to have a depression at least on its surface facing the motor vehicle component. This depression is used to accommodate an edge section of the protective cover. A clamping connection between the thrust ring and the associated surface of the motor vehicle component is advantageous in the case of this connection between the thrust ring and the protective cover. The protective cover is held in the depression of the thrust ring by means of the said clamping connection. This system can be assembled in a relatively simple manner and has, moreover, the advantage that, e.g., the cover can be replaced at any time.

To optimize the sealing system of the ball-and-socket joint according to the invention proposed as a whole, additional measures may, moreover, be provided. For example, it is possible according to the present invention to provide the second edge area of the sealing bellows with a labyrinth seal on at least one of its contact surfaces with the thrust ring. Furthermore, the contact of the edge area of the sealing bellows in the thrust ring may be improved by means of a prior-art tensioning ring, which pretensions the edge area of the sealing bellows against the thrust ring.

To prevent the edge area of the sealing bellows from slipping away in the direction of the joint ball of the ball pivot and from thus becoming automatically removed from the thrust ring, it is, furthermore, recommended that a retaining ring be arranged between the thrust ring and a groove of the joint ball. The groove of the joint ball is located in the transition area between the pivot section of the ball pivot and the joint ball, which is made in piece therewith or is arranged thereon.

Corresponding to another variant, this retaining ring may, of course, be made in one piece with the thrust ring. The area in which the edge area of the sealing bellows is inserted into the thrust ring would have approximately a U-shape when viewed in the cross section, so that the edge area of the sealing bellows would be accommodated slidingly in the thrust ring and would be secured against automatic axial slipping.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
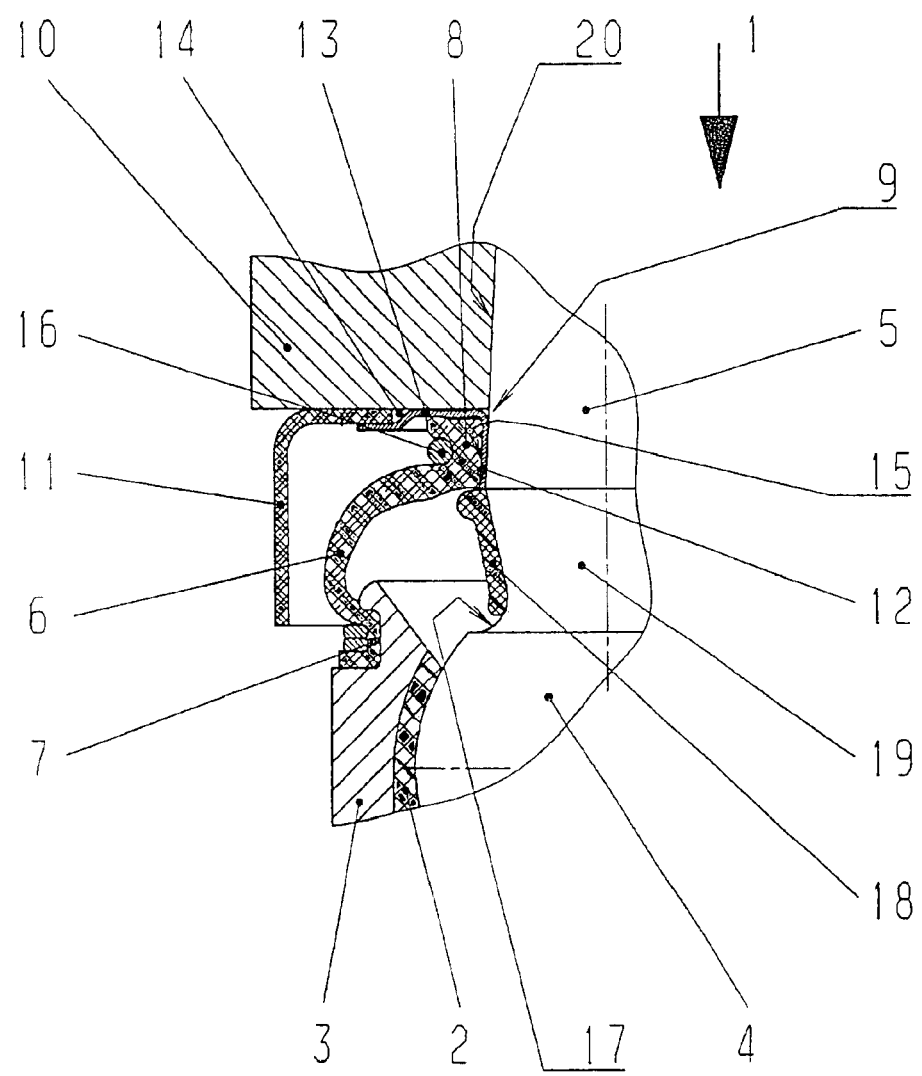
FIG. 1 is a detail of the longitudinal section of a ball-and-socket joint according to the present invention.

Referring to the drawing in particular, the drawing shows a ball-and-socket joint for motor vehicles, which has a ball pivot 1. This ball pivot passes over from a pivot section 5 with a cylindrical or slightly conical cross section into a joint ball 4 over a neck section 19. A groove 17 is present between the neck section 19 and the joint ball 4.

The joint ball 4 is supported slidingly movably in a plurality of directions in a bearing shell 2. The bearing shell 2 is in turn accommodated in a housing 3 of the ball-and-socket joint. The conical pivot section 5 of the ball pivot 1 is inserted into a mount 20 of a motor vehicle component 10, which mount 20 is designed as a hole. The ball-and-socket joint as a whole can be fastened to the motor vehicle component 10 by means of a threaded section, which is not shown in the figure and is arranged on the side of the ball pivot 1 located opposite the joint ball. During assembly, the conical part of the pivot section 5 is pulled into the mount 20 of the motor vehicle component 10 in the longitudinal direction until a sufficiently firm seating is guaranteed.

A thrust ring 9 is arranged on the ball pivot in a firmly seated manner at the end of the conical pivot section 5 of the ball pivot 1, i.e., directly in front of the transition to the neck section 19. This thrust ring 9 comprises a first collar 12, which is placed directly on the ball pivot 1, and a second collar 13, which projects from it approximately at right angles when viewed in the cross section. This second collar 13 of the thrust ring 9 is supported elastically against an associated surface of the motor vehicle component 10.

During the above-described assembly operation, i.e., during the installation of the ball-and-socket joint in the corresponding motor vehicle component 10, the second collar 13 of the thrust ring 9 comes elastically into contact with the motor vehicle component 10. The thrust ring 9 has a depression 14 in the front area of its second collar 13, which said area faces away from the ball pivot 1. A ring-shaped section of a protective cover 11 is inserted into the depression 14 in this case. A clamping connection, by means of which the edge section of the protective cover is held, is obtained between the second collar 13 and the motor vehicle component 10 due to the fact that the second collar 13 of the thrust ring 9 is supported elastically at the motor vehicle component 10.

The protective cover 11 consists of high temperature-resistant rubber in the embodiment being shown, so that the clamping connection guarantees a sealing and very firmly seated fastening for the exemplary embodiment being shown. The protective cover 11 has on the whole a pot-shaped design and surrounds a large portion of the ball-and-socket joint in the circumferential direction. When viewed in the longitudinal direction of the ball pivot, the protective cover 11 covers at least the area of the sealing bellows 6.

The sealing bellows 6, which is used to seal the inner components of the ball-and-socket joint, comprises a first edge area 7, which is arranged in a groove of the housing 3 in a firmly seated manner by means of a tensioning ring connection, and a second edge area 8, which has a sliding connection with the thrust ring 9. The contact pairing between the second edge area 8 of the sealing bellows 6 and the inner surface of the thrust ring 9 is designed in the form of a labyrinth seal 15. In the exemplary embodiment of a ball-and-socket joint shown, the labyrinth seal 15 present at the edge area 8 of the sealing bellows 9 is present on one side only. A tensioning ring 16 is used to improve the contact and consequently the sealing function of the edge area 8 of the sealing bellows 6 at the thrust ring 9. This tensioning ring 16 pretensions the edge area 8 of the sealing bellows 6 against the thrust ring surface. In the exemplary embodiment of a thrust ring 9 shown in FIG. 1, which has two collars arranged at right angles to one another in the cross section, the edge area 8 of the sealing bellows 6 would be able to slip out of the thrust ring 9 in the axial direction, i.e., in the direction of the joint ball. To prevent this, a retaining ring 18 is provided between the thrust ring 9 and a groove 17 in the transition area between the neck section 19 and the joint ball 4 of the ball pivot 1. The thrust ring 9 and the retaining ring 18 are separate parts here. The thrust ring 9 may, of course, also have a U-shaped cross section, or it is possible to make the retaining ring 18 in piece with the thrust ring 9.

While specific embodiments of the invention have been shown and described in detail to illustrate the application of the principles of the invention, it will be understood that the invention may be embodied otherwise without departing from such principles.

What is claimed is:

1. A ball-and-socket joint for motor vehicles, the ball-and-socket joint comprising:
   a housing;
   a bearing shell associated with said housing;
   a ball pivot with at least a joint ball accommodated rotatably and/or pivotably in said bearing shell of said housing, and a pivot section;
   a thrust ring, having a first contact surface in contact with said pivot section and having another contact surface in contact with said surface of a motor vehicle component and a surface spaced form said surface of said motor vehicle component;
   a sealing bellows with a first edge area fastened to said housing and with a second edge area having a sliding connection with said thrust ring fixed on said pivot section; and
   a protective cover inserted between said surface of said thrust ring spaced from said surface of said motor vehicle component and said surface of said motor vehicle component, said motor vehicle component surface facing said surface of said thrust ring.

2. A ball-and-socket joint in accordance with claim 1, wherein at least one section of said protective cover is held clampingly between said surface of said motor vehicle component and said thrust ring.

3. A ball-and-socket joint in accordance with claim 1, wherein at least one section of said protective cover has a positive-locking or non-positive connection with said thrust ring.

4. A ball-and-socket joint in accordance with claim 1, wherein said protective cover is a pot-shaped protective cover surrounding at least part of the ball-and-socket joint in a circumferential direction of the ball-and-socket joint and extensively covers said sealing bellows in a longitudinal direction of the ball-and-socket joint.

5. A ball-and-socket joint in accordance with claim 1, wherein said protective cover consists of a high temperature-resistant plastic, rubber or unvulcanized rubber, and said thrust ring consists of stainless or surface-protected metal, plastic or a composite of metal and plastic.

6. A ball-and-socket joint in accordance with claim 1, wherein said thrust ring has at least two collars forming an angle with one another and defining said first contact surface and said second contact surface respectively.

7. A ball-and-socket joint in accordance with claim 6, wherein said two collars are arranged approximately at right angles to one another in cross section, wherein a first of said two collars is arranged on said pivot section in a firmly seated manner, and a second of said collars is elastically supported against said surface of said motor vehicle component.

8. A ball-and-socket joint in accordance with claim 7, wherein said second collar has a depression accommodating an edge section of said protective cover providing said surface spaced form said surface of said motor vehicle component.

9. A ball-and-socket joint in accordance with claim 1, wherein said second edge area of said sealing bellows has a labyrinth seal on at least one contact surface that is in contact with said thrust ring.

10. A ball-and-socket joint in accordance with claim 1, further comprising a tensioning ring, wherein said second edge area of said sealing bellows is pretensioned against said thrust ring by said tensioning ring.

11. A ball-and-socket joint in accordance with claim 1, further comprising an axial securing means for said thrust ring, said axial securing means comprising a retaining ring arranged between said thrust ring and a groove of said joint ball.

12. A ball-and-socket joint in accordance with claim 11, wherein said retaining ring is made in one piece with said thrust ring.

13. A motor vehicle component and motor vehicle ball-and-socket joint combination comprising:
   a motor vehicle component having a surface; and
   a motor vehicle ball-and-socket joint including a housing, a bearing shell associated with said housing, a ball pivot with at least a joint ball accommodated rotatably and/or pivotably in said bearing shell of said housing, and a pivot section;
   a thrust ring;
   a sealing bellows with a first edge area fastened to said housing and with a second edge area having a sliding connection with said thrust ring fixed on said pivot section; and
   a protective cover inserted between a surface of said thrust ring and a surface of a motor vehicle component, which motor vehicle component surface faces said surface of said thrust ring, wherein said thrust ring has at least two collars forming an angle with one another, said two collars being arranged at an angle to one another with a first of said two collars being arranged on said pivot section in a firmly seated manner, and a second of said collars being elastically supported against said surface of said motor vehicle component, said second of said collars having a depression facing said motor vehicle component surface, said depression accommodating an edge section of said protective cover.

14. A combination in accordance with claim 13, wherein said edge section of said protective cover is held clampingly between said surface of said motor vehicle component and said depression of said thrust ring.

15. A combination in accordance with claim 13, wherein said edge section of said protective cover has a positive-locking or non-positive connection with said thrust ring.

16. A combination in accordance with claim 13, wherein said protective cover surrounds at least part of the ball-and-socket joint in a circumferential direction of the ball-and-socket joint and extensively covers said sealing bellows in a longitudinal direction of the ball-and-socket joint.

17. A combination in accordance with claim 13, wherein said protective cover consists of a high temperature-resistant plastic, rubber or unvulcanized rubber, and said thrust ring consists of stainless or surface-protected metal, plastic or a composite of metal and plastic.

18. A combination in accordance with claim 13, wherein said second edge area of said sealing bellows has a labyrinth seal on at least one contact surface that is in contact with said thrust ring.

19. A combination in accordance with claim 13, further comprising:
a tensioning ring, wherein said second edge area of said sealing bellows is pretensioned against said thrust ring by said tensioning ring; and
an axial securing means for said thrust ring, said axial securing means comprising a retaining ring arranged between said thrust ring and a groove of said joint ball.

20. A combination in accordance with claim 13,
wherein a portion of said protective cover is arranged between said depression and said motor vehicle component.

21. A combination in accordance with claim 20,
wherein said depression is arranged in a front area of said second collar, said front area facing away from said ball pivot.

22. A combination in accordance with claim 21,
wherein a portion of said protective cover is clamped between said depression and said motor vehicle component.

23. A combination in accordance with claim 22,
wherein a corner at said angle formed by said first and second collars faces said pivot section and said motor vehicle component surface.

24. A combination in accordance with claim 23,
wherein said depression has a radial section extending parallel to said motor vehicle component surface with an edge of said protective cover being arranged between said radial section and said motor vehicle component surface.

25. A motor vehicle component and motor vehicle ball-and-socket joint combination comprising:
a motor vehicle component having a surface;
a motor vehicle ball-and-socket joint including a housing, a bearing shell associated with said housing, a ball pivot with at least a joint ball accommodated rotatably and/or pivotably in said bearing shell of said housing, and a pivot section;
a thrust ring having a first collar arranged on said pivot section and a second collar elastically supported against said surface of said motor vehicle;
a sealing bellows with a first edge area fastened to said housing and with a second edge area having a sliding connection with said thrust ring fixed on said pivot section; and
a protective cover inserted between a recessed portion of said second collar and said surface of said motor vehicle component.

* * * * *